US005723210A

United States Patent [19]

Sujita et al.

[11] Patent Number: 5,723,210

[45] Date of Patent: Mar. 3, 1998

[54] ORGANIC COMPOSITE COATED STEEL SHEET

[75] Inventors: Shigeko Sujita, Chiba; Takahiro Kusakabe, Tokyo; Kyoko Hamahara; Kazuo Mochizuki, both of Chiba; Hiroyuki Tanabe, Tochigi; Masanori Nagai, Tochigi; Nobuyoshi Kato, Tochigi; Osamu Ogawa, Tochigi, all of Japan

[73] Assignees: Kawasaki Steel Corporation; Dai Nippon Toryo Co. Ltd., both of Japan

[21] Appl. No.: 654,530

[22] Filed: May 29, 1996

[30] Foreign Application Priority Data

May 30, 1995 [JP] Japan .................................... 7-131472

[51] Int. Cl.$^{6}$ .............................. C04B 9/02; B32B 15/04; B32B 15/08; B32B 15/00

[52] U.S. Cl. .......................... 428/219; 428/681; 428/659; 428/457; 428/666; 428/450; 106/14.05

[58] Field of Search .................................... 428/623, 626, 428/632, 416, 457, 681, 219, 212, 630, 659, 666, 667, 450; 106/14.05

[56] References Cited

U.S. PATENT DOCUMENTS

| | | | |
|---|---|---|---|
| 4,985,311 | 1/1991 | Shindou et al. | 428/623 |
| 5,061,575 | 10/1991 | Mohri et al. | 428/623 |
| 5,141,822 | 8/1992 | Matsuo et al. | 428/623 |
| 5,147,729 | 9/1992 | Ogishi et al. | 428/623 |
| 5,147,730 | 9/1992 | Ogishi et al. | 428/623 |
| 5,294,485 | 3/1994 | Takao et al. | 428/626 |
| 5,482,787 | 1/1996 | Sujita et al. | 428/623 |
| 5,514,483 | 5/1996 | Sujita et al. | 428/623 |

FOREIGN PATENT DOCUMENTS

| | | |
|---|---|---|
| 0 611 810 A2 | 8/1984 | European Pat. Off. . |
| 0 531 575 A1 | 3/1993 | European Pat. Off. . |
| 0 583 769 A1 | 2/1994 | European Pat. Off. . |

*Primary Examiner*—John J. Zimmerman
*Assistant Examiner*—Michael LaVilla
*Attorney, Agent, or Firm*—Austin R. Miller

[57] ABSTRACT

An organic composite coated steel sheet having excellent chromate dissolution resistance, wet adhesion, and corrosion resistance before and after working. The steel sheet comprises a chromate-silica film on at least one face of a zinc or zinc base alloy plated steel sheet, the silica-added chromate film having about 5 to 500 mg/m$^2$ in terms of metal Cr content and being formed from a chromate solution containing about 25 to 70 wt % of $Cr^{+6}$ based upon total Cr content. A resin coating film is adhered to the chromate-silica film and is formed from an aqueous paint. The aqueous paint includes an aqueous anionic resin and/or an aqueous nonionic resin, a reducing agent, and a water-dispersed silica. The resin coating film is deposited in a dry weight amount of about 0.1 to 3 g/m$^2$.

9 Claims, 3 Drawing Sheets

A : THE $Cr^{3+}$/ TOTAL Cr RATIO IN A SILICA-ADDED CHROMATE FILM AFTER AQUEOUS CHROMATE SOLUTION COATING AND BAKING AT 120°C BY XPS

B : THE $Cr^{3+}$/TOTAL Cr RATIO WHEN AN AQUEOUS REDUCTIVE SOLUTION IS APPLIED TO THE ABOVE CHROMATE FILM A AND BAKED AT 160°C BY XPS

C : THE FIXED Cr RATIO IN THE ABOVE CHROMATE FILM B $D_1$ : REDUCTION EFFECT OF THE AQUEOUS REDUCTIVE SOLUTION COATING AND BAKING $D_2$ : POLYMERIZATION EFFECT OF THE AQUEOUS REDUCTIVE SOLUTION COATING AND BAKING

FIG. 1

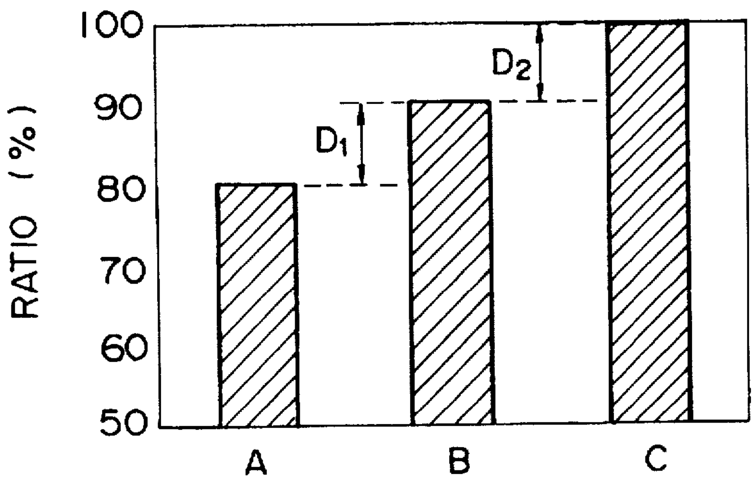

A : THE $Cr^{3+}$/ TOTAL Cr RATIO IN A SILICA-ADDED CHROMATE FILM AFTER AQUEOUS CHROMATE SOLUTION COATING AND BAKING AT 120°C BY XPS

B : THE $Cr^{3+}$/TOTAL Cr RATIO WHEN AN AQUEOUS REDUCTIVE SOLUTION IS APPLIED TO THE ABOVE CHROMATE FILM A AND BAKED AT 160°C BY XPS

C : THE FIXED Cr RATIO IN THE ABOVE CHROMATE FILM B $D_1$ : REDUCTION EFFECT OF THE AQUEOUS REDUCTIVE SOLUTION COATING AND BAKING $D_2$ : POLYMERIZATION EFFECT OF THE AQUEOUS REDUCTIVE SOLUTION COATING AND BAKING

ORGANIC COMPOSITE COATED STEEL SHEET

BACKGROUND OF THE INVENTION

1. Field of the Invention

The present invention relates to an organic composite coated steel sheet which is capable of being press-formed into an automobile body sheet. The invention exhibits excellent resistance against chromium dissolution, excellent wet adhesion, and overall corrosion resistance before and after working. The invention also relates to a method of making the coated steel sheet.

2. Description of the Related Art

Surface-treated steel sheets, in which a cold-rolled steel sheet is plated with a zinc or zinc-based alloy, then surface treated, have been increasingly utilized in automobile body applications to provide high corrosion resistance. Surface-treated steel sheets presently being used include zinc hot-dipped steel sheets, zinc-based alloy hot-dipped steel sheets, zinc electro-plated steel sheets, and zinc alloy electro-plated steel sheets. However, in body areas like the hemming portion in which coating cannot be effected after the body assembly, even greater corrosion resistance is required.

In an attempt to provide greater corrosion resistance, organic composite coated steel sheets have been proposed in, for example, Japanese Laid-Open Patent Nos. 57-108292 and 58-224174, in which an organic layer is applied on a zinc or zinc-based alloy plated steel sheet. In such art, a paint containing an aqueous or water-dispersed organic resin and a water-dispersed silica sol is applied to a zinc or zinc-based alloy plated steel sheet coated with a chromate film to promote high corrosion resistance. However, these sheets suffer from the following problems:

(1) Chromium in the residual water-soluble components in the coated film is readily dissolved during a chemical conversion treatment, resulting in environmental pollution;

(2) The resin layer is peeled off during alkaline degreasing treatments, resulting in lowered corrosion resistance; and (3) Water permeates into the resin layer in corrosive environments, and dissolves soluble components to form an alkaline solution, resulting in deteriorated adhesion between the resin layer and chromate layer.

In an effort to solve these problems, a method is disclosed in Japanese Laid-Open Patent No. 63-22637 in which a coating composition containing a hydrophobic silica and having an organic compound (in an organic solution) substituted at the surface is used along with an epoxy resin and the like. In this method, although the silica sol and organic resin are compatible and the adhesion after coating is excellent, insufficient flexibility of the coating film causes defects of the coating layer to occur at the worked portion when any working process, e.g., press working, is applied. Consequently, corrosion resistance is degraded at worked portions.

Japanese Laid-Open Patent 62-289274 discloses a method for providing a coating layer primarily containing a urethane resin and silicon dioxide to inhibit corrosion resistance degradation after working. However, this method fails to maintain adequate corrosion resistance under severe working conditions. Moreover, aqueous resin is not suitable as a coating material due to its poor compatibility with silica.

Conventionally, when the coating film contains a water soluble or water-dispersed organic silica and a water-dispersed silica, the silica is added to the chromate film in order to prevent deterioration of wet adhesion. Wet adhesion is evaluated by immersing the coated steel sheet into deionized warm water after electrodeposition and/or spray coating. However, when the steel sheet is baked at a temperature of 200° C. or less after application of the resin coating to prevent a reduction in bake hardenability (BH), the chromium dissolution resistance often decreases because the silica in the chromate film inhibits the condensation polymerization of chromium ions formed in the baking process, as well as the reduction of hexavalent chromium ions.

In an attempt to solve this problem, Japanese Laid-Open Patent No. 63-274475 discloses a process in which a colloidal silica in aqueous resin solution, a silane coupling agent, and phosphonic acid or magnesium or calcium phosphinate are added and baked so as to maintain their decomposition components in the organic coating film. Although chromium dissolution resistance is improved by this process, the obtained paint is less stable due to easy gel formation because the phosphonic acid additive forms networks with the colloidal silica, with the silane coupling agent facilitating this network formation. Further, the phosphinate additive slightly increases the corrosion resistance in non-worked areas when the additive remains in the organic coating film. However, when the sheet is subjected to a severe working process, such residual components peel from the sheet due to poor adhesiveness, thereby offsetting any corrosion resistance improvement in non-worked areas.

EPC Application No. 93113117.1 discloses an organic composite coated steel sheet having excellent corrosion resistance in an "as-worked" state in which a resin film comprising an aqueous anionic or nonionic resin and a water-dispersed silica is applied to the surface of a chromate film containing no silica. Wet adhesion is not sufficient when a low-temperature type of electrodeposition is carried out, although the steel sheet exhibits excellent corrosion resistance in the as-coated state, excellent chromium dissolution resistance, and spot weldability. When resin film contains both the water soluble or water-dispersed organic resin and the water-dispersed silica, the coating film has a significantly beneficial hydrophilic property. Thus, water molecules can readily permeate through the coating film which is formed by electrodeposition and/or spray coating, baked at a low temperature, and then immersed in deionized warm water. The hydrogen bonds will be broken by the permeated water, and thus the wet adhesion is decreased.

In addition, the aromatic hydrocarbon organic solvents used in conventional processes are known air pollutants. Thus, there has been a global demand for a drastic decrease in the use of these organic solvents.

SUMMARY OF THE INVENTION

It is an object of the present invention to provide an organic composite coated steel sheet which exhibits excellent chromium dissolution resistance, excellent wet adhesion, and overall corrosion resistance even in an as-worked state, all while utilizing a paint which minimizes the use of polluting organic solvents as much as possible.

An organic composite coated steel sheet in accordance with the present invention can be prepared by applying an aqueous paint without environmental pollution and has excellent overall corrosion resistance in an "as-worked" state, excellent wet adhesion, and chromium dissolution resistance.

We discovered that an organic composite coated steel sheet having excellent chromate dissolution resistance, excellent wet adhesion, and overall corrosion resistance in an "as-worked" state is surprisingly achieved in accordance with this invention. A silica-added chromate film is applied on at least one face of a zinc or zinc base alloy plated steel sheet. The silica-added chromate film has about 5 to 500 mg/m$^2$ in terms of metal Cr content on the surface area of the film. It is prepared by applying and baking a chromate solution containing $Cr^{+3}$ and about 25 to 70 wt % of $Cr^{+6}$ per total weight of Cr. A resin coating film is thereafter formed on the chromate film by applying and baking an aqueous paint.

The aqueous paint contains an aqueous anionic resin and/or an aqueous nonionic resin, a reducing agent, and a water-dispersed silica. The aqueous paint is deposited in an amount to provide about 0.1 to 3 g/m$^2$ of surface area after baking.

The reducing agent described above acts to reduce $Cr^{+6}$ at the interface between the silica-chromate film and the aqueous paint. It is preferred to use as the reducing agent at least one compound selected from the following group: hydrazine, mono-substituted hydrazines, amidines, amidrazones, guanidine, aminoguanidine, salts and hydrates of these, aldehydes, formic acid, oxalic acid, tannic acid and gallic acid. Among these formic acid, oxalic acid, tannic acid, and/or hydrazine hydrate are preferable.

More preferably, the reducing agent is formic acid, oxalic acid, and/or hydrated hydrazine and is added in an amount of about 0.01 to 3 parts by weight to 100 parts by weight of the resin.

Additionally, a water-dispersed silica sol having an average diameter ranging from about 0.005 to 2 μm is preferably used.

Further, a water-dispersed chain-like silica sol having an average diameter ranging from about 0.02 to 0.6 μm is preferably used.

Moreover, a water-dispersed hydrophilic fumed silica is preferably used.

It is preferred that the resin coating film has a dry composition comprising about 10 to 100 parts by weight of the silica and about 100 parts by weight of the resin.

It is also preferred that the aqueous anionic resin is an aqueous anionic urethane resin.

It is more preferred that the aqueous anionic resin is an aqueous anionic urethane resin having an elongation of about 50 to 1,000% and a tensile strength of about 200 kgf/cm$^2$.

It is preferred that the aqueous paint is baked at a steel sheet temperature of about 90° to 200° C. which removes excess reducing agent so that significant amounts of the reducing agent do not remain in the resin coating film.

The invention also involves a method of producing the newly discovered organic composite coated steel sheet. The method involves applying a chromate solution containing about 50 to 300 wt % of silica and about 25 to 70 wt % of $Cr^{+6}$ based on the total weight of the Cr, on at least one face of the zinc or zinc alloy-plated steel sheet. The resulting steel sheet is then baked at a sheet temperature of about 90° to 200° C. to form a silica-added chromate film on the sheet. Onto the chromate film is applied an aqueous paint comprising an aqueous anionic resin and/or an aqueous nonionic resin, a reducing agent, and a water-dispersed silica. Thereafter, the sheet is baked at a sheet temperature of about 90° to 200° C. to expel substantially all of the reducing agent from the resin coating film.

We have also discovered a preferred embodiment of the invention in which the organic composite coated steel sheet comprises a silica-added chromate film on at least one face of a zinc or zinc base alloy plated steel sheet, the silica-added chromate film having a density on the surface of about 5 to 500 mg/m$^2$ expressed as metallic Cr. The chromate is formed from a chromate solution containing $Cr^{+3}$ and about 25 to 70 wt % of $Cr^{+6}$ based upon total Cr. The resin coating film is deposited on the chromate film in an amount of about 0.1 to 3 g/m$^2$ of surface area after baking. The resin coating film comprises an aqueous anionic resin and/or an aqueous nonionic resin. Because of the action of the reducing agent, the ratio of $Cr^{+3}$ to $Cr^{+6}$ in this preferred embodiment gradually increases in the thickness direction from the innermost portion of the chromate film toward the outer portion of the chromate film which is in contact with the resin coating film.

BRIEF DESCRIPTION OF THE DRAWINGS

FIG. 1 is a graph illustrating the effect of the reducing agent in a resin paint;

DETAILED DESCRIPTION OF THE INVENTION

Figure 2:
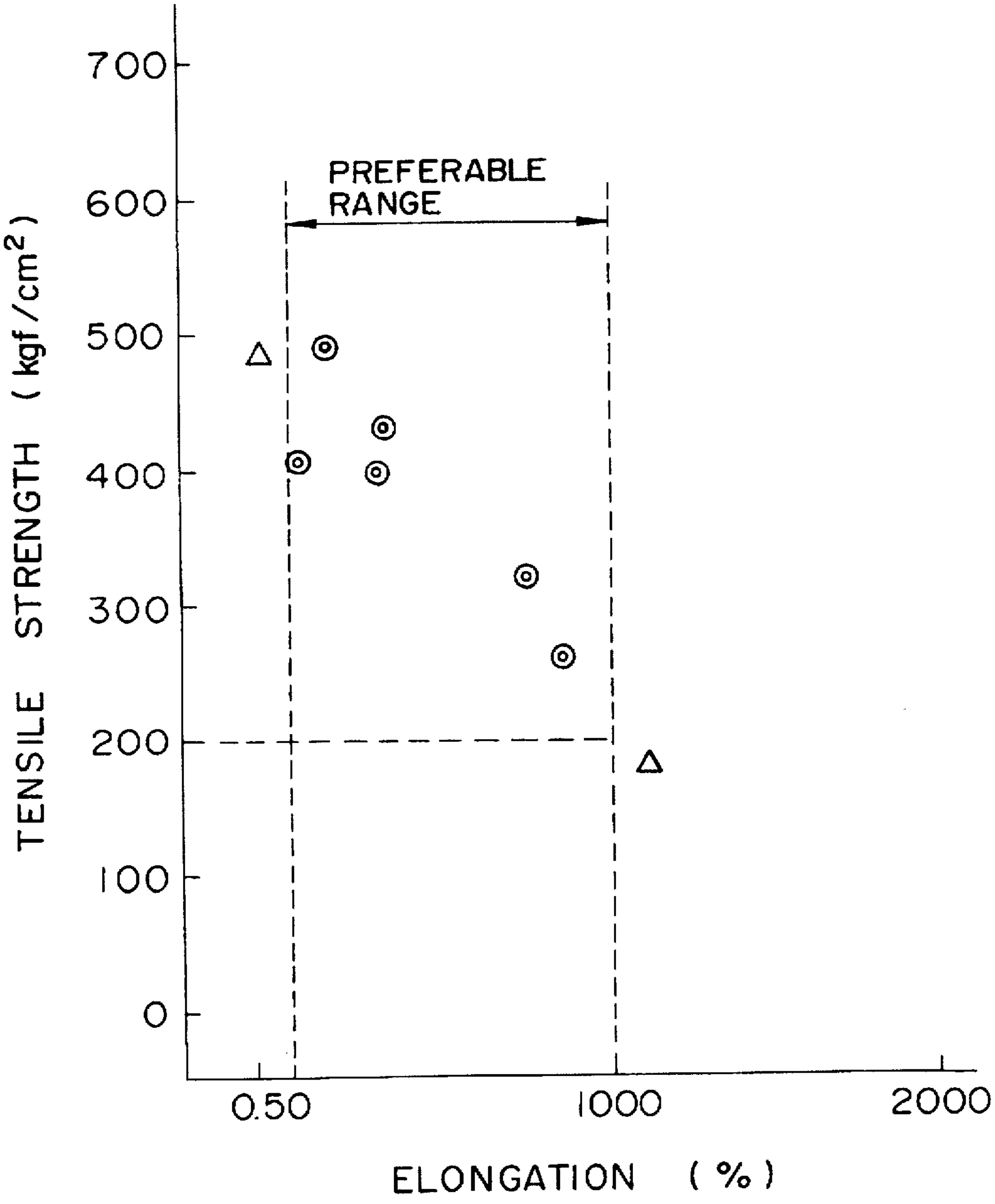
FIG. 2 is a graph showing the change of the corrosion resistance in an "as-worked" state with elongation and tensile strength of an aqueous anionic urethane resin.

A steel sheet in accordance with the present invention has a zinc or zinc-based alloy plating. Examples of acceptable platings include pure zinc plating; binary alloy plating such as Zn—Ni alloy plating, Zn—Fe alloy plating, and Zn—Cr alloy plating; ternary alloy plating such as Zn—Co—Cr alloy plating; and composite dispersive plating such as Zn—$SiO_2$ plating and Zn—Co—Cr—$Al_2O_3$ plating. The plating of the steel sheet may be accomplished by electrodeposition, hot-dipping, or vapor phase plating for example.

A silica-added chromate film is formed on the zinc or zinc-based alloy plated steel sheet and serves to improve adhesion with a subsequently applied organic polymer resin layer (resin coating film) described below, as well as to enhance corrosion resistance.

The adhesion of the chromate film to the resin film on the steel sheet is important to the present invention, over and above the fact that silica added to the chromate film can provide corrosion resistance.

In the present invention, silica is present in the aqueous chromate solution and introduces silica having silanol groups in the chromate film to improve the resulting wet adhesion of the film. The coating adhesive force between the chromate film and resin film is improved due to the interaction between the silanol groups in the silica and the polar groups in the resin film. This interaction also provides corrosion resistance in an "as-worked" state.

The amount of the adhered chromate in the film is about 5 to 500 mg/m$^2$ in terms of metal Cr content, and preferably about 10 to 150 mg/m$^2$. The amount is expressed as all forms of Cr converted into metallic Cr. A density on the surface area of less than about 5 mg/m$^2$ does not provide sufficient corrosion resistance and adhesion with the resin coating film. On the other hand, when the quantity applied exceeds about 500 mg/m$^2$ of surface area, no further improvement in corrosion resistance is achieved, and the resistance of the insulation coating increases and causes deterioration of spot weldability and electrodeposition adhesion.

Either or both of liquid phase silica and gas phase silica can be preferably used. The content of added silica is preferably about 50 to 300% of the total amount of Cr. It serves to improve the adhesion of the chromate film.

The chromate film coating process can be carried out through a chromate coating method using a roll coater, an electrolytic chromate method, and a reactive chromate method.

The $Cr^{+6}$ content in the chromate solution may be preferably about 25 to 70% of the total Cr content. The term "total Cr" refers to the sum content of all forms of Cr, including $Cr^{+3}$ and $Cr^{+6}$. A $Cr^{+6}$ content of less than about 25% does not accomplish the self-healing effect to the corrosion due to $Cr^{+6}$, whereas a content over about $Cr^{+6}$ undesirably decreases resistance to chromium dissolution in the alkaline dewaxing process.

An organic composite film is applied to the chromate film surface. The organic composite film comprises a water-dispersed silica, a resin selected from aqueous anionic resins, aqueous nonionic resins, and aqueous urethane resins, and a reducing agent. The reducing agent is added to achieve a hard solubilization of the water soluble components in the silica-added chromate film.

In the present invention, by applying and baking a resin paint containing a reducing agent on a silica-added chromate film, the reducing agent in the paint comes in contact with the surface of the silica-added chromate film. The chromium dissolution resistance is improved while maintaining high corrosion resistance by the following two effects created in the surface layer of the chromate film: (1) $Cr^{+6}$ is reduced to a less-soluble $Cr^{+3}$; and (2) the chromate is polymerized due to deoxidization by the reducing agent. Preferably, the ratio of $Cr^{+3}$/total Cr content in the chromate film gradually increases in the thickness direction from the center of the chromate film to the resin coating film. This distribution provides maximum chromium dissolution resistance at the exterior chromate layer surface, which is the portion of the chromate layer most likely to encounter chromium solvents.

The beneficial effects of the reducing agent were demonstrated by the following test:

An aqueous solution containing only a reducing agent was baked on a silica added chromate film prepared under the conditions described below. FIG. 1 is a graph illustrating the change of the ratio of $Cr^{+3}$ to the total Cr in the surface layer of the chromate film before and after applying and baking the aqueous reducing agent solution as determined by XPS, and the fixed chromium content after the baking was determined from the amount of the dissolved chromium by a procedure which will be explained in the examples.

Plating: Zn-13.0% Ni (electrodeposition), plating weight= 20 g/m$^2$

Silica-added chromate solution:

$Cr^{+6}$/total Cr ratio=28 wt %,

Cr deposit=50 mg/m$^2$

Silica/total Cr ratio=150 wt %

Aqueous reducing agent solution:

0.007 wt % of hydrazine monohydrate (Wako Pure Chemical Industries, Ltd.),

Fixed chromium rate: (Cr deposit after chemical conversion treatment)/(Cr deposit before chemical conversion treatment)×100.

FIG. 1 shows that the aqueous reducing agent solution has effects identical to that of the resin paint containing the reducing agent, and the baking treatment includes a reductive effect D1 and a polymerization effect D2 which result in excellent chromium dissolution resistance and corrosion resistance.

It has been known in prior art that a chromate film having high chromium dissolution resistance can be obtained by adding a reducing agent in the aqueous chromate solution immediately before coating to increase the $Cr^{+3}$ content in the solution. However, in such prior art, since the $Cr^{+3}$ ions can readily react with the silica to form a three dimensional network structure, the chromate solution cannot be preserved for a long time. When a weak reducing agent is used, the aqueous chromate solution does not gel in the short-term. However, chromium dissolution resistance is lost, or a desired corrosion resistance cannot be achieved due to the reduction of the chromate film over time.

It is desirable that the reducing agent added to the resin paint does not remain in the resin film after baking. When the reducing agent remains in the resin film after baking, the chromate film is reduced over time, and the reducing agent itself causes poor corrosion resistance.

We discovered that such disadvantages can be mitigated by controlling the amount of the reducing agent added and the baking temperature of the resin paint.

Examples of preferable reducing agents include at least one of hydrazine, monosubstituted hydrazines, amidines, amidrazones, guanidine, aminoguanidine, salts and hydrates of these, aldehydes, formic acid, oxalic acid, tannic acid, and/or gallic acid. More preferable monosubstituted hydrazines may include those having 1 to 10 carbon atoms. More preferable amidines and amidrazones may include those having 1 to 10 carbon atoms. More preferable aldehydes may include formaldehyde, acetaldehyde, enanthaldehyde, acrolein, crotonaldehyde, benzaldehyde, salicylaldehyde, opianic acid and phthalaldehyde.

The most preferable reducing agent includes at least one of formic acid, tannic acid, and/or hydrazine hydrates.

In the present invention, since the organic resin paint contains no silane coupling agent, defects such as gelation of the paint can be completely prevented.

The amount of the reducing agent to be added to the organic resin paint is preferably about 0.01 to 3 parts by weight to 100 parts by weight of the resin. An amount of less than 0.01 parts by weight does not improve the chromium dissolution resistance, whereas an amount over about 3 parts by weight does not further improve chromium dissolution resistance, increases raw material costs, and can increase the reduction of hexa-valent chromium caused by reducing agent remaining in the resin film, resulting in corrosion resistance degradation.

The aqueous resin can be obtained by using a water-soluble resin or water-dispersive resin, each having hydrophilic groups in the resin molecule, or a resin emulsion obtained by a forced emulsification process. The preferable aqueous resin is the water-dispersive resin. Both the resin emulsion and residual emulsifier may cause a decrease in corrosion resistance because the resin emulsion still contains residual emulsifier and the water-soluble resin has a low molecular weight. In addition, water-dispersive resins containing an emulsifier can be preferably used.

As a result of investigations of aqueous resins, we discovered that aqueous anionic resins and aqueous nonionic resins can be preferably used in the invention.

The terms "aqueous anionic resin" and "aqueous nonionic resin" refer to aqueous resins having anionic hydrophilic groups and nonionic hydrophilic groups in their respective resins. Typical examples of the anionic hydrophilic groups include a carboxyl group, a sulfonate group, and phosphonate ester groups, and examples of the nonionic hydrophilic groups include a hydroxyl group and a methylol group. In the aqueous resin in accordance with the present invention, such anionic hydrophilic or nonionic hydrophilic groups exist in the resin molecule. The reason for using these aqueous anionic or nonionic resins is that the aqueous silica sol having negative charges is dispersed in the paint. If any cationic resin is used, electrical repulsion cannot be expected, and thus the paint is gelated which renders the application of the paint to the steel sheet difficult.

Any appropriate resin having anionic or nonionic hydrophilic groups can be used without limitation in the present invention. Examples of preferably used resins include acrylic resins, epoxy resins, urethane resins, alkyd resins, and polyester resin; modified resins in which the main chains of these polymers are partly modified, such as urethane modified epoxy resins, polybasic acid modified epoxy resins, acrylic modified epoxy resins, epoxy modified urethane resins, and acrylic modified urethane resins; and their neutralized resins. However, because carboxylated polyethylene resins exhibit poor corrosion resistance and spot weldability, such resins are excluded from the present invention.

Aqueous anionic resins also can be preferably used as aqueous resins in accordance with the present invention. Urethane resins are polymers having many urethane bonds in their main chains, and their main chains can be preferably modified with acrylic, epoxy, alkyd, or ester groups.

In the case of aqueous anionic urethane resins, the compatibility between the elongation and tensile strength of the resin is important. Preferable ranges of the elongation and tensile strength are about 50 to 1,000%, and about 200 $kgf/cm^2$ or more, respectively. FIG. 2 shows the results of corrosion resistance in an "as-worked" state of urethane resins having the various elongations and tensile strengths shown. The test samples were obtained under the following conditions:

Plating: Zn-13.0%Ni (electrodeposition), plating weight= 20 $g/m^2$

Silica-added chromate solution:

$Cr^{+6}$/total Cr ratio=50 wt %,

Cr deposit=40 $mg/m^2$

Silica/total Cr ratio=150 wt %

Resin layer:

Aqueous anionic urethane resin and water-dispersed chain like silica (ST-UP made by Nissan Chemical Industries, Ltd.), and 1 parts by weight of tannic acid (Fuji Kagaku Kogyo) to 100 parts by weight of the resin, resin:silica=80:20, deposit=0.7 $g/m^2$ For evaluating the corrosion resistance in an "as-worked" state, after each test piece is subjected to a cylindrical form test (area ratio: 2.0, and wrinkle preventing pressure: 1,000 kg), it is subjected to a cyclic corrosion test in which a cycle includes 5% aqueous NaCl solution spraying at 35° C. for 4 hours, drying at 60° C. for 2 hours, and exposing a humid environment of RH 95% at 50° C. for 2 hours. The rust formed on the side of the test piece after 200 test cycles was evaluated according to a standard described in the examples below.

FIG. 2 demonstrates that the corrosion resistance in an "as-worked" state is excellent in the range of about 50 to 1,000% in terms of elongation and about 200 $kgf/cm^2$ or more for tensile strength, respectively.

It is important that the silica in the organic composite coating film in accordance with the present invention contains an appropriate amount of silanol groups on its surface, in order to stably maintain zinc-based corrosion products in a corrosive environment, thereby securing high corrosion resistance. Water-dispersed silica is most preferably used because it can contain sufficient quantities of silanol groups.

Examples of preferably used water-dispersed silica include (1) a water-dispersed silica sol in which particle size is controlled to about 0.005 to 2 μm by adjusting the charge of the surface through alkaline metal ions or multi-valent metal ions, and (2) a hydrophilic fumed silica dispersed in water by an adequate dispersant.

Average diameter of the water-dispersed silica sol (1) preferably ranges from about 0.005 to 2 μm. When the average diameter is less than about 0.005 μm, the spot weldability is lowered due to homogeneous silica dispersion in the resin layer. When the average diameter exceeds about 2 μm, considerable amounts of silica particles bleed at the resin layer, resulting in poorer spot weldability due to electrode damage. The bleeding silica particles increase electrical resistance between the electrode and steel sheet, thereby causing welding sparks and electrode damage. The silica particles may be homogeneous particles, linear particles (chain-like), and aggregates or agglomerates, so long as the primary particle average diameter is within the range set forth above.

Since the fumed silica (2) has silanol groups on its surface through dispersion in water, the corrosion products mentioned above can be stably maintained. The effect is markedly enhanced when the fumed silica (2) is combined with an aqueous resin, resulting in excellent corrosion resistance.

The dry weight ratio of the aqueous resin to the water-dispersed silica in the resin layer is preferably about 10 to 100 parts by weight of silica to about 100 parts by weight of the resin. A silica content of less than about 10 parts by weight does not provide high corrosion resistance because the zinc-based corrosion products formed in the film are not stable in a corrosive environment. On the other hand, when the silica content exceeds about 100 parts by weight, the silica becomes incompatible with the resin composition. Thus, it is difficult to apply such composition to steel sheet, and the spot weldability of the coated sheet is lowered due to the extremely high electrical resistance on the steel sheet surface.

Figure 3:
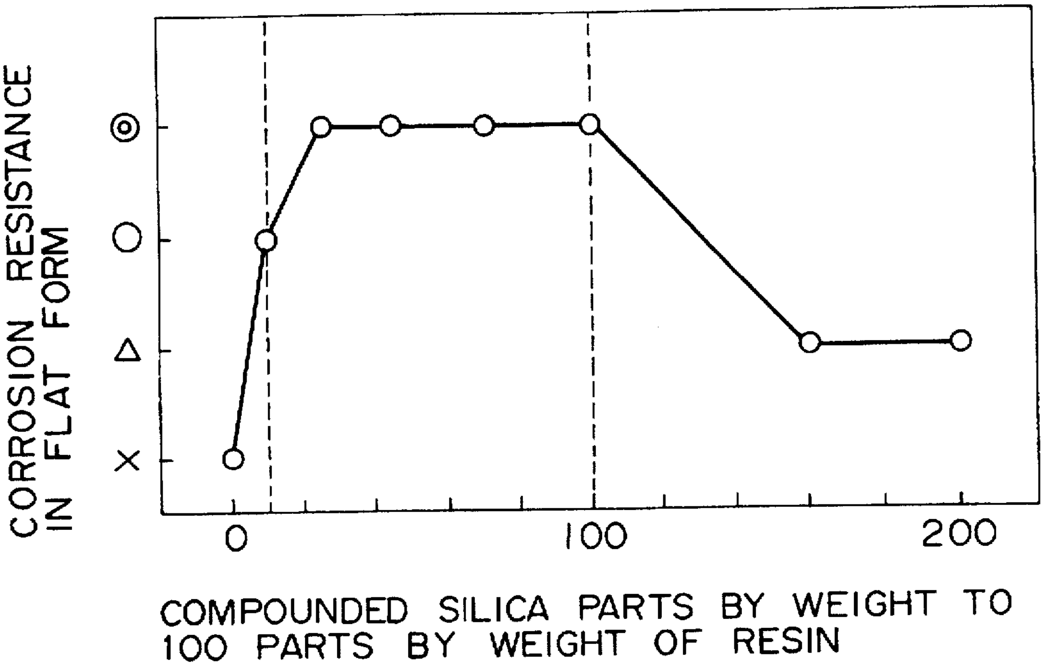
FIG. 3 is a graph showing the effect of the silica content of the silica-added resin coating film on the corrosion resistance of the steel sheet in a flat (unworked) form.

FIG. 3 shows the results of corrosion resistance tests in unworked (flat form) steel sheets treated with resin films having various silica to resin compounding ratios according to the following conditions:

Plating: Zn-13.0%Ni (electrodeposition), plating weight= 20 $g/m^2$

Silica-added chromate solution:

$Cr^{+6}$/total Cr ratio=50 wt %,

Cr deposit=40 $mg/m^2$

Silica/total Cr ratio=150 wt %

Resin layer:

Aqueous anionic acrylic resin and water-dispersed fumed silica (AEROSIL 136 made by Nihon Aerosil K.K., particle size=15 nm), 0.2 parts by weight of hydrazine monohydrate (Wako Pure Chemical Industries, Ltd.) and 0.3 parts by weight of formic acid (Mitsubishi Gas Chemical Co., Inc.) to 100 parts by weight of the resin, deposit=0.5 $g/m^2$ The rust formed on the flat test piece after 200 test cycles was evaluated according to a standard in the examples below.

FIG. 3 demonstrates that excellent corrosion resistance in flat form is achieved in the compounding range of about 10 to 100 parts by weight of the silica to about 100 parts by weight of the resin.

The aqueous paints in accordance with the present invention may further include any crosslinking agents in response to the baking condition.

The resin composition in accordance with the present invention may be applied to the chromate film surface on the plated steel sheet by any coating method, including roll coating, spraying, shower coating, or air-knife coating. The sheet temperature in the baking treatment for drying may be about 90° to 200° C. Because the sheet can be dried at a temperature of about 160° C. or less, the sheet can be dried without lowering bake hardenability.

The baking is preferably carried out so that formic acid, tannic acid, and hydrazine hydrates do not substantially exist in the aqueous resin on the chromate film after baking at about 90° to 200° C. These reducing agents will not exist in the resin film when the baking is carried out completely within the above temperature range. Residual reducing agents undesirably decrease the corrosion resistance of the sheet.

The dry thickness of the resin film, i.e., the deposited amount of the solid film after baking, must be from about 0.1 to 3.0 $g/m^2$, and is preferably about 0.5 to 2.0 $g/m^2$. Satisfactory corrosion resistance cannot be achieved with a dry thickness of less than about 0.1 $g/m^2$, whereas a thickness over about 3.0 $g/m^2$ causes increased electric resistance, decreased spot weldability, and decreased electrodeposition paintability.

When the organic composite coated steel sheet in accordance with the present invention is exposed to a corrosive environment without additional coatings, the deposited amount of the organic resin film is preferably about 0.3 $mg/m^2$. When any additional coating, such as an electrodeposited coating, is applied to the above steel sheet, the deposited amount of organic resin film necessary for satisfactory corrosion resistance is about 0.1 $g/m^2$ or more.

The organic resin layer may be applied to one side or both sides of the sheet depending on the intended use. When only one side is coated, the non-coated side may have a zinc-based plating, a chromate layer on the zinc base plating, or a cold-rolled face.

EXAMPLES

The present invention will now be explained in detail through illustrative examples. The examples are not intended to limit the scope of the invention defined in the appended claims.

Examples 1 to 8 and Comparative Examples 1 to 8

Several 0.7 mm thick steel sheets having zinc-based alloy plating on both sides were degreased, subjected to a chromate coating treatment with a roll coater to provide various deposit quantities, then baked at a sheet temperature of 120° C. Thereafter, various paints were applied with a roll coater followed by baking at a maximum sheet temperature of 150° C. Each paint comprised an aqueous resin, a silica of a designated particle size, and additives.

The following resins were used:

A: Anionic urethane resin containing carboxyl groups neutralized with diethylamine (acid value: 50, weight average molecular weight: 20,000);

B: Anionic epoxy resin containing carboxyl groups neutralized with diethylamine (acid value: 45, weight average molecular weight: 12,500);

C: Anionic urethane resin containing carboxyl groups neutralized with triethylamine (acid value: 48, weight average molecular weight: 15,000);

D: Nonionic acrylic resin (weight average molecular weight: 28,000, glass transition temperature: 18° C.);

E: Nonionic acrylic-modified epoxy resin (weight average molecular weight: 35,000, glass transition temperature: 42° C.);

F: Anionic epoxy-modified urethane resin containing carboxyl groups neutralized with diethylamine (acid value: 60, weight average molecular weight: 38,000);

G: Anionic urethane resin containing carboxyl groups neutralized with triethylamine (acid value: 48, weight average molecular weight: 78,000); and H: Cationic urethane resin neutralized with acetic acid (amine value: 45, weight average molecular weight: 35,000).

The following silicas were used:

A: Water-dispersed silica sol comprising particles of uniform size (made by Nissan Chemical Industries, Ltd.);

B: Water-dispersed silica sol comprising agglomerated particles (made by Nissan Chemical Industries, Ltd.);

C: Water-dispersed chain-like silica sol (made by Nissan Chemical Industries, Ltd.); and D: Water-dispersed hydrophilic fumed silica (specific area: 200 $m^2/g$, made by Nihon Aerosil K.K.).

Additives used were as follows:

A: Formic acid (Mitsubishi Gas Chemical Co., Inc.);

B: Tannic acid (Fuji Kagaku Kogyo); and

C: Hydrazine monohydrate (Mitsubishi Gas Chemical Co., Inc.).

The following tests were carried out to evaluate these organic composite coated steel sheet products:

The volatile organic compound (VOC) content in the paint used was determined as a measure of pollutants released during the production process. VOC content was calculated using the following equation:

$$\text{VOC content}=(A)\times(\text{specific gravity of paint})\times 100\ (\text{g/liter})$$

wherein A represents organic solvents in the paint (weight %).

A smaller VOC content indicates that the paint generates less pollutants.

The corrosion resistance in flat (unworked) form was evaluated by subjecting each test piece to a cyclic corrosion test. One cycle of the test comprises spraying a test piece with a 5% aqueous NaCl solution at 35° C. for 4 hours, drying at 60° C. for 2 hours, and exposing the test piece to a humid environment of RH 95% at 50° C. for 2 hours. The rust formed on the test piece after 200 cycles was evaluated according to the following standard:

◎: No rust

○: Rusted area comprising 10% or less

Δ: Rusted area comprising more than 10% to 20%

×: Rusted area comprising more than 20%

Corrosion resistance in the "as-worked" state was evaluated by subjecting each test piece to a cylindrical form test (area ratio: 2.0, and wrinkle preventing pressure: 1,000 kg), followed by a cyclic corrosion test in which a cycle comprises spraying a test piece with a 5% aqueous NaCl solution at 35° C. for 4 hours, drying at 60° C. for 2 hours, and exposing the test piece to a humid environment of RH 95% at 50° C. for 2 hours. The rust formed on the test piece during 200 cycles of tests was evaluated according to the following standard:

◎: No rust

○: Rusted area comprising 10% or less

Δ: Rusted area comprising more than 10% to 20%

×: Rusted area comprising more than 20%

Chromium dissolution resistance was determined by fluorescent X-ray spectroscopy. Change in chromium deposition was measured before and after degreasing, washing with water, surface preparation, and chemical conversion treatments. The evaluation standards employed were as follows:

○: 1 $mg/m^2$ or less

Δ: 1 $mg/m^2$ to 2 $mg/m^2$

×: More than 2 $mg/m^2$

Electrodeposition paintability was determined according to the following procedure. After a four-step treatment including degreasing, washing with water, surface preparation, and chemical conversion, electrodeposition was conducted at 20° C. by raising the voltage to 150 V over a 30 second time interval, and maintaining that voltage for 180 seconds using Electrodeposition Paint Power Top U-600M made by Nippon Paint Co., Ltd. Thereafter, the samples were baked at 170° C. for 20 minutes. Appearance after electrodeposition was evaluated based on the following standards:

○: No craters (pinholes)

Δ: Craters number less than 5/$cm^2$

×: Craters number 5/$cm^2$ or more

Wet adhesion was evaluated through the following procedure. After electrodeposition using the U-600M paint under the condition set forth above, an intercoat paint, Sealerwhite KPX-50 made by Kansai Paint Co., Ltd., was applied to test samples by spraying and baking to a thickness of approximately 35 μm, and top paint, Lugabake BQM-1 made by Kansai Paint Co., Ltd., was sprayed and baked to a thickness of approximately 35 μm. The sample was then immersed into deionized water at 40° C. for ten days. After being removed from the water, a check pattern was notched using a pitch of 100 checks/2 mm by 2 mm with a NT cutter. Cellophane tape was then adhered onto the check pattern and peeled off it to determine the residual coating film remaining on test samples. The standard of evaluation was as follows:

⊚: Residual coating remaining is 100%

○: Residual coating remaining is 95% to 100%

Δ: Residual coating remaining is 85% to 95%

×: Residual coating remaining is less than 85%

Spot weldability was evaluated through the following procedure. Using a welding tip having a top diameter of 6 mm ϕ made of $Al_2O_3$-dispersed copper-based alloy, continuous welding was conducted at a pressure of 200 kgf, a welding current of 9 kA, and a welding interval of one spot per two seconds (corresponding actual welding time of 10 cycles at 50 Hz). The number of spots (points), that could be continuously welded until the nugget diameter fell below a predetermined lower limit was determined. The standard of evaluation was as follows:

⊚: 3,000 Points or more

○: 2,000 Points or more to less than 3,000 points

Δ: 1,000 Points or more to less than 2,000 points

×: Less than 1,000 points

Table 1 summarizes the compositions and depositions of the chromate layers and organic resin layers, the silica dispersion state in the applied organic resin layer, and the test results for Examples of the Invention as well as for Comparative Examples. As revealed in Table 1, the Examples of the Invention exhibit surprisingly excellent chromium dissolution resistance, corrosion resistance both in unworked (flat form) and as-worked states, wet adhesion, electrodeposition paintability and spot weldability, particularly when contrasted with the Comparative Examples.

The organic composite coated steel sheet in accordance with the present invention has excellent chromium dissolution resistance, corrosion resistance in flat (unworked) form, corrosion resistance in an "as-worked" state, wet adhesion, electro-deposition paintability, and spot weldability as described set forth above, and can be readily used for automobile bodies and other demanding applications. Further, the organic composite coated steel sheet can be produced without contributing to environmental pollution.

Although this invention has been described with reference to specific elements and method steps, equivalent elements and method steps may be substituted, the sequence of method steps may be varied, and certain elements and method steps may be used independently of others. Further, various other elements and control steps may be included, all without departing from the spirit and scope of the invention defined in the appended claims.

TABLE 1-1

Examples

| No. | Sheet: Plating Type *1 | Sheet: Deposition $g/m^2$ | Chromate Layer: $Cr^{6+}$/Total Cr Ratio % | Chromate Layer: Added Silica % *2 | Chromate Layer: Deposition $mg/m^2$ | Organic Resin Layer, Organic Resin: Type | Organic Resin: Elongation % | Organic Resin: Tensile Strength $Kgf/cm^2$ |
|---|---|---|---|---|---|---|---|---|
| 1 | Zn(C) | 60 | 30 | 200 | 40 | A | 700 | 300 |
| 2 | Zn(C) | 60 | 30 | 200 | 40 | B | — | — |
| 3 | Zn—Ni(E) | 20 | 35 | 150 | 40 | C | 1000 | 200 |
| 4 | Zn—Ni(E) | 20 | 35 | 150 | 40 | D | — | — |
| 5 | Zn—Ni(E) | 20 | 50 | 150 | 40 | A | 700 | 300 |
| 6 | Zn(E) | 30 | 50 | 150 | 40 | E | — | — |
| 7 | Zn(E) | 30 | 50 | 150 | 40 | F | 150 | 350 |
| 8 | Zn—Ni(E) | 20 | 30 | 200 | 60 | G | 150 | 350 |

*1: (E) Electrodeposition, Ni content 12.3 wt %, (C) Hot dipped plating
*2: Silica weight % to Total Cr weight

TABLE 1-2

| | Examples | | | | | | | | | | | | | |
|---|---|---|---|---|---|---|---|---|---|---|---|---|---|---|
| | Organic Resin Layer | | | | | | | | Corrosion Resistance in | Corrosion Resistance in | Resistance for Chromium | Electro-deposi-tion | | |
| | Additives | | Silica | | | | | | | | | | | |
| No. | Type | Added amount *3 | Type | Average Particle Size µm | Compounded Amount *3 | Deposi-tion g/m² | VOC content g/l | | Flat Form | as-worked | Dis-solution | Paint-ability | Wet Adhe-sion | Spot Weld-ability |
| 1 | A + B | 1.0 + 0.5 | A | 0.01 | 25 | 0.7 | 0 | | ⊚ | ⊚ | ○ | ○ | ⊚ | ○ |
| 2 | A + B | 1.0 + 0.5 | C | 0.13 | 25 | 0.7 | 95 | | ○ | ○ | ○ | ○ | ⊚ | ○ |
| 3 | C | 0.1 | C | 0.13 | 25 | 0.5 | 0 | | ⊚ | ⊚ | ○ | ○ | ⊚ | ⊚ |
| 4 | C | 0.5 | C | 0.13 | 25 | 1.5 | 0 | | ⊚ | ⊚ | ○ | ○ | ⊚ | ⊚ |
| 5 | C | 2.0 | B | 0.4 | 25 | 2.0 | 0 | | ⊚ | ⊚ | ○ | ○ | ⊚ | ⊚ |
| 6 | B + C | 0.5 + 0.3 | D | — | 40 | 0.5 | 0 | | ○ | ○ | ○ | ○ | ⊚ | ○ |
| 7 | A + B + C | 0.3 + 0.3 + 0.5 | B | 2.0 | 40 | 0.5 | 0 | | ○ | ○ | ○ | ○ | ⊚ | Δ |
| 8 | C | 0.1 | C | 0.2 | 20 | 0.5 | 0 | | ○ | ○ | ○ | ○ | ⊚ | ○ |

*3: The amount added to 100 parts by weight of the organic resin.

TABLE 1-3

| | Comparative Examples | | | | | | | |
|---|---|---|---|---|---|---|---|---|
| | Sheet | | Chromate Layer | | | Organic Resin Layer Organic Resin | | |
| No. | Plating Type *1 | Deposition g/m² | Cr⁶⁺/Total Cr Ratio % | Added Silica % *2 | Deposition mg/m² | Type | Elongation % | Tensile Strength Kgf/cm² |
| 1 | Zn(C) | 60 | 30 | 0 | 50 | D | — | — |
| 2 | Zn—Ni(E) | 20 | 40 | 100 | 50 | H | 400 | 300 |
| 3 | Zn—Ni(E) | 20 | 40 | 100 | 50 | B | — | — |
| 4 | Zn—Ni(E) | 20 | 50 | 250 | 50 | G | 150 | 350 |
| 5 | Zn—Ni(E) | 20 | 75 | 100 | 50 | A | 700 | 300 |
| 6 | Zn(E) | 30 | 15 | 50 | 50 | B | — | — |
| 7 | Zn(E) | 30 | 30 | 100 | 600 | B | — | — |
| 8 | Zn—Ni(E) | 20 | 35 | 150 | 40 | B | — | — |

*1: (E) Electrodeposition, Ni content 12.3 wt %, (C) Hot dipped plating
*2: Silica weight % to Total Cr weight

TABLE 1-4

| | Comparative Examples | | | | | | | | | | | | | |
|---|---|---|---|---|---|---|---|---|---|---|---|---|---|---|
| | Organic Resin Layer | | | | | | | | Corrosion Resistance in | Corrosion Resistance in | Resistance for Chromium | Electro-deposi-tion | | |
| | Additives | | Silica | | | | | | | | | | | |
| No. | Type | Added amount *3 | Type | Average Particle Size µm | Compounded Amount *3 | Deposi-tion g/m² | VOC content g/l | | Flat Form | as-worked | Dis-solution | Paint-ability | Wet Adhe-sion | Spot Weld-ability |
| 1 | C | 1.0 | A | 0.01 | 40 | 0.6 | 0 | | Δ | Δ | ○ | ○ | X | ○ |
| 2 | C | 1.0 | B | 0.5 | 50 | 1.3 | 0 | | X | X | ○ | ○ | Δ | ○ |
| 3 | A | 2.0 | A | 0.01 | 25 | 4.5 | 0 | | ○ | ○ | ○ | X | Δ | X |
| 4 | nil | 0 | A | 0.01 | 25 | 0.6 | 0 | | ○ | ○ | X | ○ | ○ | ○ |
| 5 | B | 0.5 | C | 0.10 | 25 | 0.6 | 0 | | ○ | ○ | X | ○ | Δ | ○ |
| 6 | A | 0.2 | A | 0.01 | 20 | 0.7 | 100 | | X | X | ○ | ○ | Δ | ○ |
| 7 | A | 0.2 | A | 0.01 | 20 | 0.7 | 100 | | ○ | ○ | ○ | Δ | Δ | X |
| 8 | A | 0.2 | A | 0.01 | 20 | 0.05 | 100 | | X | X | ○ | ○ | Δ | ⊚ |

*3: The amount added to 100 parts by weight of the organic resin.

What is claimed is:

1. An organic composite coated steel sheet comprising:

(a) a zinc-based plating layer composed of zinc or a zinc-based alloy adhered to a surface of said steel sheet;

(b) a chromate-silica film adhered to the resulting surface of said zinc-based plating layer, said chromate-silica film containing silica and about 5 to 500 mg/m$^2$ of chromium expressed as metallic Cr, said chromate-silica film being formed from a chromate solution containing about 25 to 75 wt % of $Cr^{+6}$ based upon the sum of all forms of Cr, including $Cr^{+3}$ and $Cr^{+6}$; and (c) a resin coating film adhered to said chromate-silica film, said resin coating film comprising at least one resin selected from the group consisting of an aqueous anionic resin and an aqueous nonionic resin, said resin coating film being formed from a water-dispersed silica and about 0.01 to 3 parts by weight of a reducing agent to about 100 parts by weight of said resin, said resin coating film being deposited on the surface of said chromate-silica film in a dry weight amount of about 0.1 to 3 g/m$^2$, said resin coating film having a dry weight composition comprising about 10 to 100 parts by weight of said water-dispersed silica and about 100 parts by weight of said resin, said resin coating film being substantially free of unreacted reducing agent, wherein said chromate in said chromate-silica film includes $Cr^{+3}$ in a ratio to total Cr that increases in the thickness direction of said chromate-silica film from within said film toward the film surface.

2. An organic composite coated steel sheet according to claim 1, wherein said reducing agent is at least one compound selected from the group consisting of hydrazine, mono-substituted hydrazines, amidines, amidrazones, guanidine, aminoguanidine, salts and hydrates of any of these foregoing compounds, aldehydes, formic acid, oxalic acid, tannic acid and gallic acid.

3. An organic composite coated steel sheet according to claim 1, wherein said reducing agent is at least one compound selected from the group consisting of formic acid, oxalic acid, and hydrated hydrazine.

4. An organic composite coated steel sheet according to claim 1, wherein said water-dispersed silica is a water-dispersed silica sol having an average diameter ranging from about 0.005 to 2 μm.

5. An organic composite coated steel sheet according to claim 1, wherein said water-dispersed silica is a water-dispersed silica sol of multiple silicon atoms joined in a chain, said sol having an average diameter ranging from about 0.02 to 0.6 μm.

6. An organic composite coated steel sheet according to claim 1, wherein said water-dispersed silica is a water-dispersed hydrophilic fumed silica.

7. An organic composite coated steel sheet according to any one of claims 1 to 6, wherein said aqueous anionic resin is an aqueous anionic urethane resin.

8. An organic composite coated steel sheet according to any one of claims 1 to 6, wherein said aqueous anionic resin is an aqueous anionic urethane resin having a percentage elongation to breakage of about 50 to 1,000% and a tensile strength of about 200 kgf/cm$^2$.

9. An organic composite chromate coated steel sheet having excellent chromate dissolution resistance, wet adhesion, and corrosion resistance before and after working, comprising:

(a) a plating layer composed of a zinc or a zinc-based alloy adhered to a surface of said steel sheet;

(b) a chromate-silica film having an inner portion adhered to said surface of said plating layer, said chromate-silica film containing silica and about 5 to 500 mg/m$^2$ of total Cr expressed as metallic Cr, and said film being formed from a chromate solution containing about 50 to 300 wt % silica, and from about 25 to 70 wt % of $Cr^{+6}$ based upon total Cr expressed as metallic Cr; and (c) a resin coating film adhered to an outer surface of said chromate-silica film in a dry weight amount of about 0.1 to 3 g/m$^2$, said resin coating film comprising at least one resin selected from the group consisting of an aqueous anionic resin and an aqueous nonionic resin, and said resin coating film further including a water-dispersed silica;

wherein said chromate in said chromate-silica film includes $Cr^{+3}$ wherein the ratio of $Cr^{+3}$/total Cr in said chromate film gradually increases in the thickness direction from said inner portion of said chromate-silica film to said outer surface of said chromate-silica film adjacent to said resin coating film.

* * * * *

UNITED STATES PATENT AND TRADEMARK OFFICE
CERTIFICATE OF CORRECTION

PATENT NO. : 5,723,210

DATED : March 3, 1998

INVENTOR(S) : Shigeko Sujita, et al

It is certified that error appears in the above-indentified patent and that said Letters Patent is hereby corrected as shown below:

In column 5, line 11, please change ""total Cr" refers to the sum content" to --"total Cr content" refers to the sum--; and at line 14, please insert --70%-- after "about".

Signed and Sealed this

Tenth Day of November 1998

Attest:

BRUCE LEHMAN

*Attesting Officer*

*Commissioner of Patents and Trademarks*